W. J. P. MOORE.
DEMOUNTABLE RIM.
APPLICATION FILED MAY 27, 1915.

1,238,176.

Patented Aug. 28, 1917.
2 SHEETS—SHEET 1.

Inventor
William J. P. Moore,
per Fred C. Acker,
Atty.

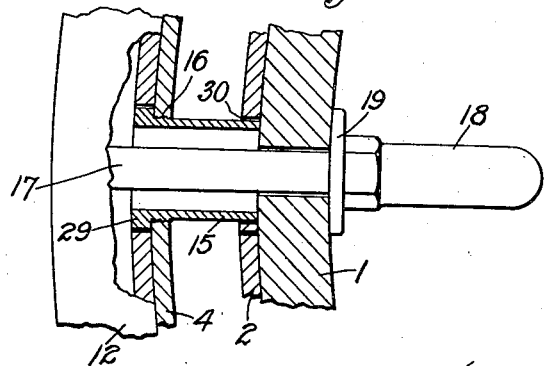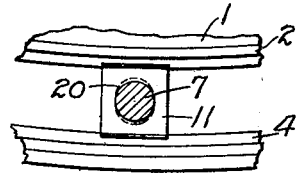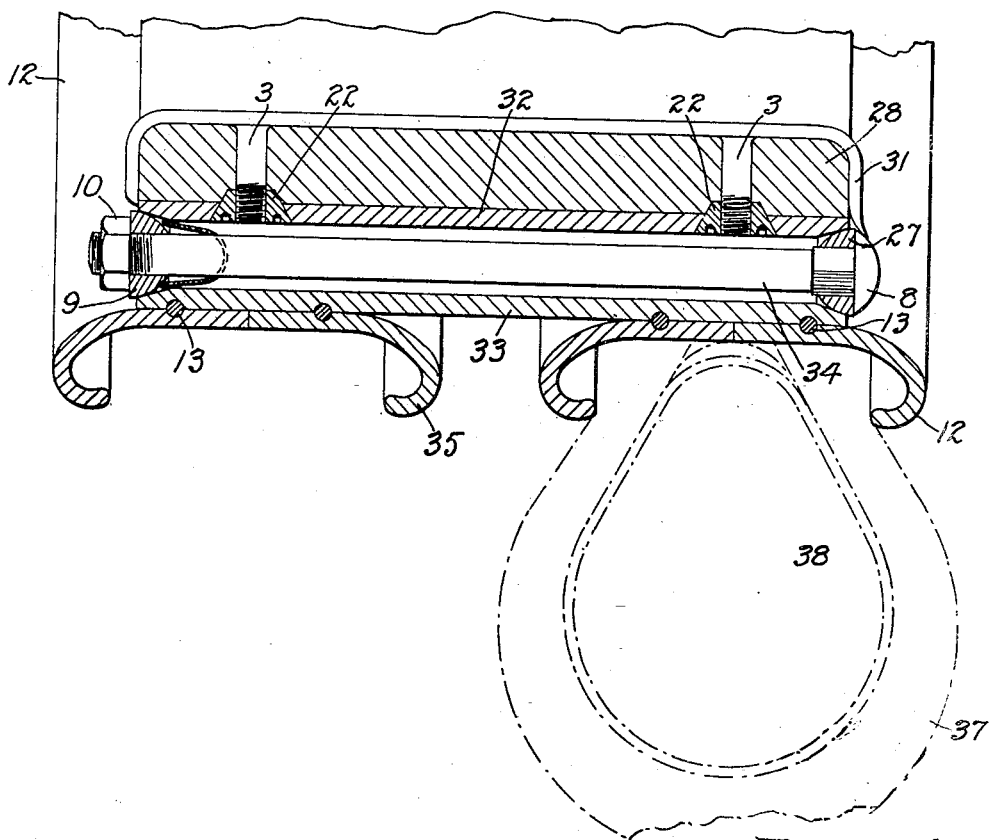

UNITED STATES PATENT OFFICE.

WILLIAM J. P. MOORE, OF NEW YORK, N. Y.

DEMOUNTABLE RIM.

1,238,176.     Specification of Letters Patent.     Patented Aug. 28, 1917.

Application filed May 27, 1915. Serial No. 30,711.

*To all whom it may concern:*

Be it known that I, WILLIAM J. P. MOORE, a citizen of the United States, residing at New York, in the county of New York and State of New York, have invented certain new and useful Improvements in Demountable Rims, of which the following is a specification, reference being had therein to the accompanying drawing.

My invention refers to certain novel and useful improvements in wheel rims for use with pneumatic, cushion, or similar tires, the rim being of the class commonly called demountable, which has the characteristic of being capable of being readily removed from and applied to the rest of the wheel, said rim carrying with it ordinarily an inflated tire so that upon the occurrence of a puncture, the injured tire may be quickly removed from the wheel and a new inflated tire substituted in its place by the aid of the speedy dismounting and re-assembling of the parts. The invention has for its object to simplify the use of a rim of this character by reducing the number of its parts and so relating them that they can be more easily dispersed or assembled than is possible with other forms now in common use. The invention, therefore, consists essentially in the various details and peculiarities in the construction, arrangement and combination of the various mechanical elements in their operative relation to each other for the purpose of attaining the object in view, substantially as will be hereinafter described and then more particularly pointed out in the claims.

In the accompanying drawing illustrating my invention:

Fig. 4 is a cross-section of the means for protecting the air valve on an enlarged scale;

Fig. 5 is a sectional detail on the line 5, 5 of Fig. 2;

Fig. 6 is a cross-sectional view of a modified form of the invention.

Similar characters of reference designate corresponding parts throughout the different figures of the drawing.

Figure 1:
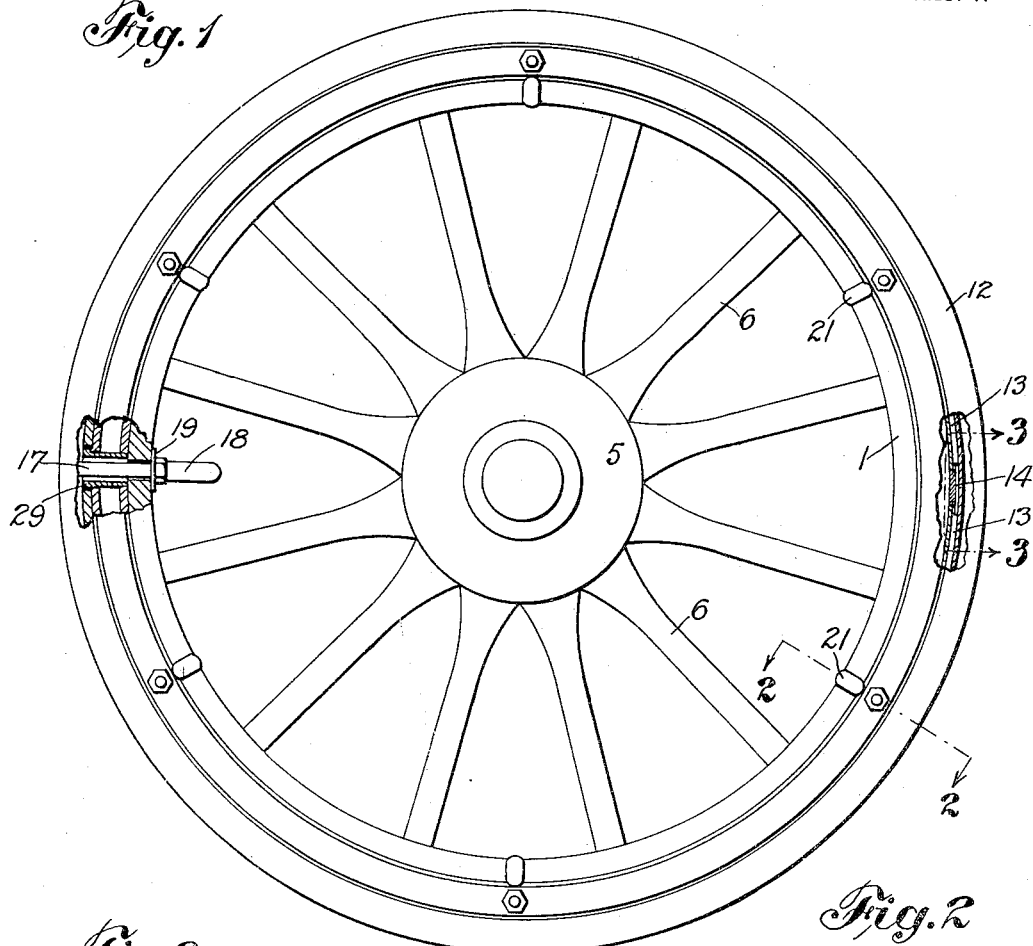
Figure 1 is a side elevation of my improved demountable rim with certain parts shown in section.

1 designates the felly, which is usually of wood and is supported at the outer ends of the spokes 6 that lead from the felly to the hub 5, these parts being common and well-known. The felly 1 is provided with the clips or engaging members 21 commonly used with demountable rims, and on the outside of the felly 1 is a metal band 2 secured to the felly by means of the screws 3 carried by the members 21 and passing through the felly and having countersunk nuts 22, said metal band 2 having the beveled or inclined faces 23 near each edge.

12, 12 represent duplicate removable sections of a clencher rim for holding the ordinary rubber shoe, within which is the inflatable inner tube. Between this outer rim and the band 2, just described, is another circular metallic locking ring 4 similar to the band 2, and removed therefrom a short distance, but it is placed in close contact with the clencher rim which is firmly seated thereon. The locking ring 4 is provided near its edges with inclined faces 24 similar to the faces 23 of the band 2, but reversely inclined. This ring 4 consists of a piece of spring metal having an outward tension and severed or divided at one point in its circumference where a space is left, in which space is placed a transverse pin or key 14 between the adjacent ends of the ring to keep them apart and prevent the ring from compressing inwardly when the demountable rim is off the wheel and is being carried on the car, which compression might possibly occur through jarring or otherwise. In order to more easily keep the key in place between these adjacent ends, said ends are preferably formed with a slight curvature or concave grooves, as shown in Fig. 1. The removal of the key 14 allows the adjacent ends of the ring 4 to be pressed together sufficiently far to easily dislodge the ring 4 from contact with the surrounding clencher rim. Instead of spring metal rings 4, rings of any other suitable material may be used.

A series of bolts 7, six or any other suitable number, lie in the space between the band 2 and ring 4. These bolts are furnished at one end with heads 8 engaged by the clips 21, and the heads 8 of the various bolts fit tightly against circular strips 27 that engage the inclined faces 23 and 24 of the band 2 and ring 4. The other ends of the bolts 7 are screw-threaded and provided with nuts 10 that screw up tightly against curved strips 9 corresponding to the strips 27, which strips 9 engage the faces 23 and 24 near the other edges of the band 2 and ring 4. By means of these bolts 7 the members 2 and 4 are bound tightly together into a firm and compact combination through the engagement of the strips 9 and 27 with the inclined faces. I find it convenient to employ with each bolt 7 a curved spring support 11 whose ends are slightly bent to engage the inclined faces 23 and 24, said spring 11 being formed with a central opening 20 through which the bolt 7 passes. The spring, therefore, serves to keep the bolt from falling out of position when the nut and clamping strips have been removed in the process of changing the position of the parts.

Figure 3:
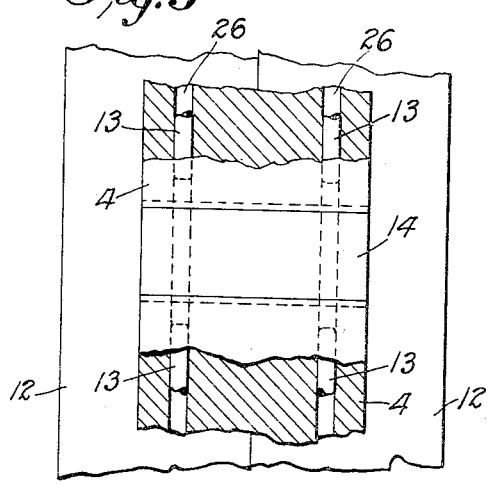
Fig. 3 is an enlarged sectional side view on the line 3, 3 of Fig. 1.
Figure 2:
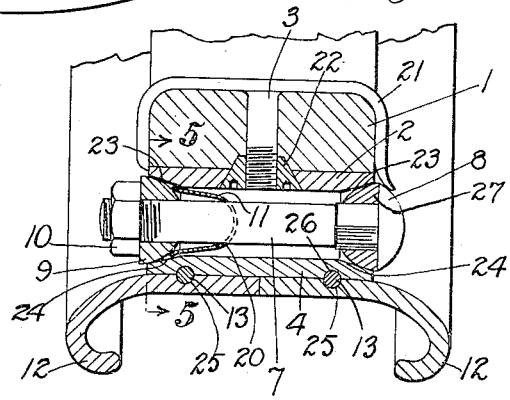
Fig. 2 is an enlarged cross-section on the line 2, 2 of Fig. 1.

The duplicate sections 12 of the clencher rim are provided with circumferential grooves 25, one in each, that coincides with corresponding circumferential grooves 26 on the adjacent face of the ring 4, and these coinciding grooves are adapted to contain wires 13, which are resilient and are in the form of a split ring, with a short space between the ends, as is shown in Fig. 3, this split allowing them to be more easily removed from the grooves. The tension of these wire rods 13 holds them in their grooves when the locking ring 4 is taken from the rim sections 12.

It will be obvious that when it is desired to disconnect the parts, all the user of the wheel needs to do is to remove the nuts 10 from the bolts 7 so that these bolts may be loosened up sufficiently to release the strips 9 and 27, and then remove the rim sections 12 (with the tire) and the locking ring 4 with the wires 13 as a unit from the wheel. When this is done access can be had to the inside of ring 4 and the locking key 14 removed, and the ring 4 may then be collapsed away from the rim sections 12, the wires 13 which are bent or sprung on a larger circle than the rim sections 12 remaining in the grooves of the rim sections 12. The two rim sections 12 are then free to move laterally so that the tire can be removed and a new one substituted, after which these elements may be again reassembled.

There is provided special means for taking care of the position of the air valve and locking rings, and in order to do this I employ a tubular sleeve 15 threaded at 16 to engage a screw-threaded opening in the ring 4. This sleeve 15 has near the screw-threaded end a flange 29 fitting closely against the ring 4 and being circular in form and engaging loosely the circular opening in the rim sections 12. The end of the sleeve 15 opposite to its point of attachment to the ring 4 loosely enters an opening 30 in the felly band 2. In this way the parts are properly related to each other and the sleeve 15 offers a protection for the stem 17 of the air valve device which is connected to the inner tube within the shoe carried in the clencher, said stem 17 passing in the usual way through the felly 1 and having thereon the clamping nut 19 and the dust cap 18. Sleeve 15 also connects band 2, ring 4 and rim sections 12 and locks them to prevent rotation.

In Fig. 6 I have represented a modification of the invention showing its applicability to a wide felly used with a truck wheel, or otherwise, and carrying a pair of demountable rims. 28 denotes the felly, in connection with which is arranged a clip 31, the felly band 32, the removable ring 33, the bolts 34, and the rim sections 35, the parts being all associated with each other in the manner similar to that shown in the other figures of the drawing, with the exception that the felly, its band, the locking ring and the other devices are made of proper size to accommodate therewith a pair of clencher rims instead of a single one, in order that a pair of tires may be used.

Many changes in the precise construction and arrangement of the various parts may be made without exceeding the scope of the appended claims, and I, therefore, reserve the liberty of varying and changing the exact details within wide limits without sacrificing the advantages of the invention or impairing the value of the claims.

Having thus described my invention, what I claim as new and desire to secure by Letters Patent, is:

1. The combination with a wheel, of a surrounding flexible locking ring with a portion of its circumference removed, a key inserted in the space between the ends of said locking ring at times to prevent compression of the ring, outer flanged rim sections carrying the tire, and split rings introduced between the rim sections and the divided locking ring.

2. The combination with a wheel, of a locking ring severed at one point of its circumference and provided with a key, said ring being circumferentially grooved, flanged rim sections surrounding the locking ring and being likewise grooved at points opposite to the grooves in the locking ring, split wire rings introduced between the locking ring and the rim sections, and means for securing these parts upon the wheel.

3. The combination with a wheel, of a demountable rim including a locking ring severed at one point of its circumference and provided with a key, and circumferentially grooved at points, flanged rim sections surrounding the locking ring and coincidentally grooved, split wire rings carried loosely in said grooves.

4. The combination with a wheel of a locking ring severed at one point of its circumference and having its opposing ends grooved, a key inserted between said ends at times to prevent compression of the ring, flanged rim sections, surrounding the locking ring, and split wire rings introduced between the rim sections and the locking ring for connecting them together.

In testimony whereof I affix my signature.

WILLIAM J. P. MOORE.